US008438636B2

(12) United States Patent
Isaacs et al.

(10) Patent No.: US 8,438,636 B2
(45) Date of Patent: May 7, 2013

(54) SECURE AND EXTENSIBLE POLICY-DRIVEN APPLICATION PLATFORM

(75) Inventors: Scott Isaacs, Bellvue, WA (US); Stephen Mark Yolleck, Sunnyvale, CA (US); Ronald Keith Logan, Everett, WA (US)

(73) Assignee: Microsoft Corporation, Redmond, WA (US)

( * ) Notice: Subject to any disclaimer, the term of this patent is extended or adjusted under 35 U.S.C. 154(b) by 1098 days.

(21) Appl. No.: 12/118,321

(22) Filed: May 9, 2008

(65) Prior Publication Data

US 2009/0183171 A1 Jul. 16, 2009

Related U.S. Application Data

(60) Provisional application No. 61/020,597, filed on Jan. 11, 2008.

(51) Int. Cl.
*H04L 29/06* (2006.01)

(52) U.S. Cl.
USPC .................................. 726/22; 726/1

(58) Field of Classification Search .................. None
See application file for complete search history.

(56) References Cited

U.S. PATENT DOCUMENTS

| | | | |
|---|---|---|---|
| 5,623,604 A | 4/1997 | Russell et al. |
| 5,987,611 A | 11/1999 | Freund |
| 6,321,334 B1 | 11/2001 | Jerger et al. |
| 6,345,361 B1 | 2/2002 | Jerger et al. |
| 6,385,301 B1 | 5/2002 | Nolting et al. |
| 6,473,800 B1 | 10/2002 | Jerger et al. |
| 6,490,626 B1 | 12/2002 | Edwards et al. |
| 6,519,647 B1 | 2/2003 | Howard et al. |
| 7,051,366 B1 | 5/2006 | LaMacchia et al. |
| 7,093,244 B2 | 8/2006 | Lajoie et al. |
| 7,185,210 B1 | 2/2007 | Faden |
| 7,240,015 B1 | 7/2007 | Karmouch et al. |
| 7,281,132 B2 | 10/2007 | Bender et al. |

(Continued)

FOREIGN PATENT DOCUMENTS

WO 01/53965 A1 7/2001

OTHER PUBLICATIONS

Unknown, "Block JavaScript, VBScript, and/or Embedded Objects," MalekTips, last accessed on Oct. 20, 2008, available at http://malektips.com/zonealarm_pro_0008.html, 1 page.

(Continued)

*Primary Examiner* — Hadi Armouche
*Assistant Examiner* — Malcolm Cribbs
(74) *Attorney, Agent, or Firm* — Senniger Powers LLP

(57) ABSTRACT

System of evaluating security of script content. A processor executes computer-executable instructions for defining a policy for the script content in a web page. The script content provides interactions between a user and other content within the web page. The defined policy indicates an execution boundary of the script content. The processor further evaluates the script content against the execution boundary in the defined policy. At run time, the processor transforms at least a portion of the web page in response to the evaluating. An interface transmits the web page with the transformed portion of the script content to be rendered in an application on a host device.

17 Claims, 16 Drawing Sheets

U.S. PATENT DOCUMENTS

| | | | |
|---|---|---|---|
| 7,406,502 B1 | 7/2008 | Oliver et al. | |
| 7,480,907 B1 | 1/2009 | Marolia et al. | |
| 7,600,224 B2 | 10/2009 | Obayashi et al. | |
| 2002/0178375 A1 | 11/2002 | Whittaker et al. | |
| 2002/0188689 A1 | 12/2002 | Chung | |
| 2003/0023774 A1 | 1/2003 | Gladstone et al. | |
| 2003/0088807 A1 | 5/2003 | Mathiske et al. | |
| 2003/0177389 A1 | 9/2003 | Albert et al. | |
| 2003/0229501 A1 | 12/2003 | Copeland et al. | |
| 2004/0054791 A1 | 3/2004 | Chakraborty et al. | |
| 2004/0078591 A1 | 4/2004 | Teixeira et al. | |
| 2004/0167964 A1 | 8/2004 | Rounthwaite et al. | |
| 2005/0022012 A1 | 1/2005 | Bluestone et al. | |
| 2005/0066290 A1 | 3/2005 | Chebolu et al. | |
| 2005/0120242 A1 | 6/2005 | Mayer et al. | |
| 2005/0182924 A1 | 8/2005 | Sauve et al. | |
| 2005/0198153 A1 | 9/2005 | Keohane et al. | |
| 2005/0223412 A1 | 10/2005 | Nadalin et al. | |
| 2006/0015728 A1 | 1/2006 | Ballinger et al. | |
| 2006/0031347 A1 | 2/2006 | Sahi | |
| 2006/0041636 A1 | 2/2006 | Ballinger et al. | |
| 2006/0047959 A1 | 3/2006 | Morais | |
| 2006/0056431 A1 | 3/2006 | Toyoda et al. | |
| 2006/0143688 A1 | 6/2006 | Futoransky et al. | |
| 2006/0150256 A1 | 7/2006 | Fanton et al. | |
| 2006/0277592 A1 | 12/2006 | Brown et al. | |
| 2007/0016949 A1* | 1/2007 | Dunagan et al. | 726/22 |
| 2007/0016954 A1 | 1/2007 | Choi et al. | |
| 2007/0028185 A1 | 2/2007 | Bhogal et al. | |
| 2007/0056019 A1* | 3/2007 | Allen et al. | 726/1 |
| 2007/0094712 A1 | 4/2007 | Gibbs et al. | |
| 2007/0100915 A1 | 5/2007 | Rose et al. | |
| 2007/0101435 A1 | 5/2007 | Konanka et al. | |
| 2007/0106650 A1 | 5/2007 | Moore | |
| 2007/0107057 A1 | 5/2007 | Chander et al. | |
| 2007/0124797 A1 | 5/2007 | Gupta et al. | |
| 2007/0136579 A1 | 6/2007 | Levy et al. | |
| 2007/0174419 A1 | 7/2007 | O'Connell et al. | |
| 2007/0180490 A1 | 8/2007 | Renzi et al. | |
| 2007/0192839 A1 | 8/2007 | Fee et al. | |
| 2007/0271342 A1 | 11/2007 | Brandt et al. | |
| 2008/0010615 A1 | 1/2008 | Curtis et al. | |
| 2008/0046518 A1 | 2/2008 | Tonnison et al. | |
| 2009/0043739 A1 | 2/2009 | Choi | |
| 2009/0070872 A1 | 3/2009 | Cowings et al. | |
| 2009/0083714 A1 | 3/2009 | Kiciman et al. | |
| 2009/0138937 A1* | 5/2009 | Erlingsson et al. | 726/1 |

OTHER PUBLICATIONS

MuffnCharizard, "Having download problems (About mobile code)," available at http://forums.zonelabs.com/zonelabs/ board/message?board.id=AllowAccess&message.id, 2005, 2 pages.

Trevor, et al., "Defeating Script Injection Attacks with Browser Enforced Embedded Policies," available at http://www2007.org/papers/paper595.pdf, May 8-12 2007, 10 pages.

Evans, David, "Policy-Directed Code Safety," available at http://www.cs.virginia.edu/~evans/phd-thesis/thesis.ps.gz, Feb. 2000, 137 pages.

Erlingsson, et al., "End-to-end Web Application Security," available at http://www.usenix.org/events/hotos07/tech/ full_papers/erlingsson/erlingsson_html/, Apr. 2007, 6 pages.

Miller, et al., "Caja, Safe active content in sanitized JavaScript," Draft Tech report, Nov. 5, 2007, 22 pages.

ieblog, "Using Frames More Securely," available at http://blogs.msdn.com/ie/archive/2008/01/18/using-frames-more-securely.aspx, published on Jan. 18, 2008, 12 pages, USA.

Unknown, "About URL Security Zones, " available at http://msdn2.nnicrosoft.com/en-us/library/ms537183(printer). aspx, printed on Jan. 23, 2008, 9 pages, USA.

Unknown, "Enterprise Start Pages and Mashup Applications Online," available at http://datamashups.com, 2006, 2 pages.

Couvreur, Julien, "Curiosity is bliss, " Web API Authentication for Mashups, available at http://blog.monstuff.com/archives/000296.html, Jun. 25, 2006, 7 pages.

Jackson, et al., "Subspace: Secure CrossDomain Communication for Web Mashups," available at http://www.collinjackson.com/research/papers/fp801-jackson.pdf, May 8-12, 2007, 10 pages.

Wang, et al., Protection and Communication Abstractions for Web Browsers in MashupOS, available at http://research.microsoft.com/~helenw/papers/sosp07MashupOS.pdf, Oct. 14-17, 2007, 15 pages. USA.

Notification of Transmittal of the International Search Report and the Written Opinion of the International Searching Authority in International Application No. PCT/US2008/087265, dated Jun. 25, 2009, 11 pgs.

* cited by examiner

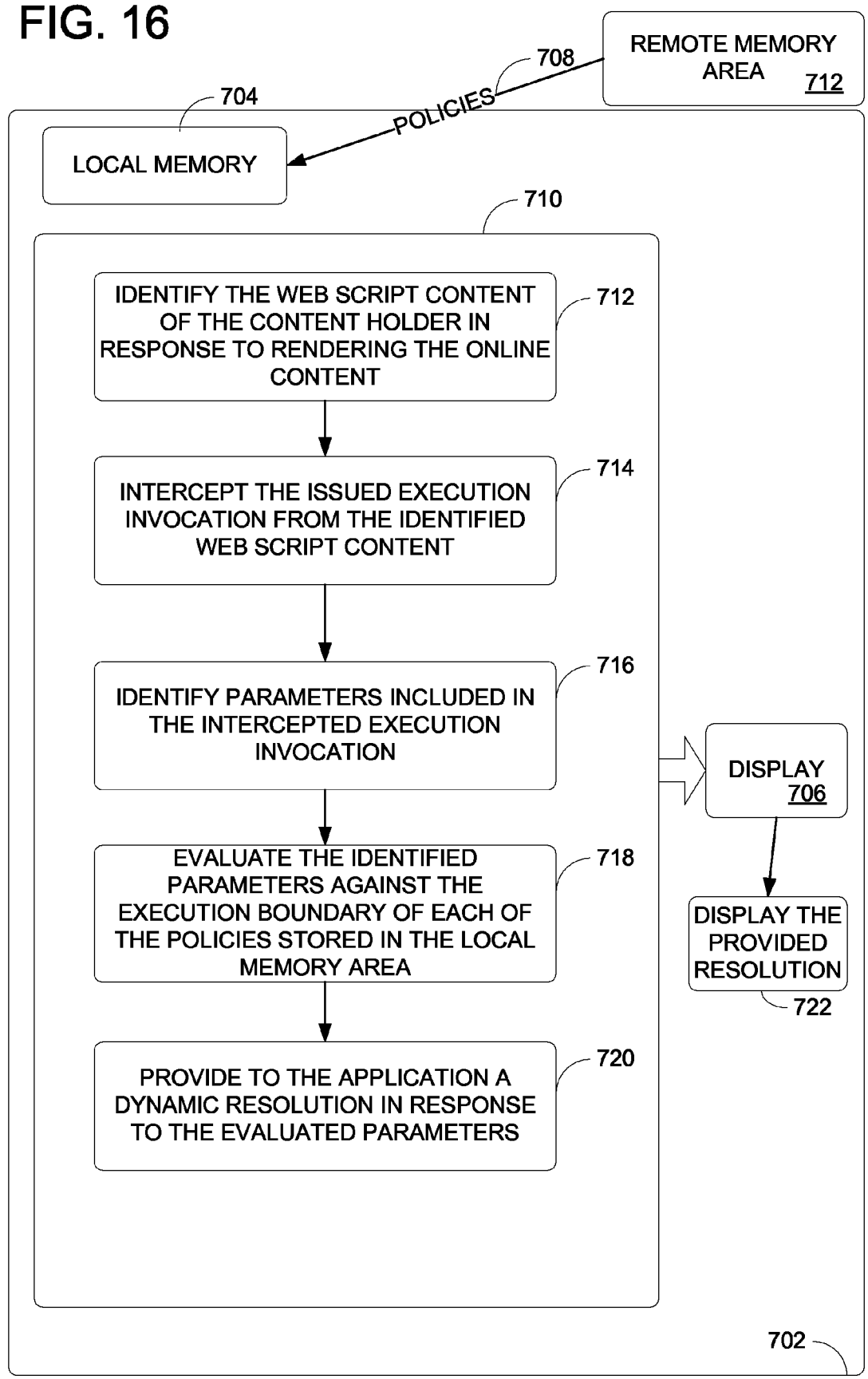

US 8,438,636 B2

SECURE AND EXTENSIBLE POLICY-DRIVEN APPLICATION PLATFORM

BACKGROUND

Contents available on the Internet have gone through an explosive transformation in recent years. The static texts or still picture images in the web pages that impressed early online users have been replaced by dynamic animations, rich multimedia video clips, and dynamic web page layouts. In addition, contents in web pages have become interactive at runtime; the users can use input devices (e.g., mouse or stylus) or user's fingers to move or rearrange objects within web pages for rich customization.

One of the driving forces in this interactive development is the use of script-content in the form of computer-executable instructions that can be executed by the applications or software (e.g., a web browser) at or near runtime. One example of such developments is a mashup or mash-up, which is a web application that combines code and behaviors from various sources for integration within an experience or for creating new experiences. However, due to the nature of the browser, as mash-ups are executed when it is rendered or before it is rendered, most mash-ups are creating implied trust relationships between the host site and third-party code within the web pages. This trust-relationship puts web-sites and the underlying web business models at risk. In addition, because of the interactive nature of mash-up codes or scripts, the trust-relationship may also put the user's personal or private content presented on the web pages and/or local device at risk.

SUMMARY

Embodiments of the invention solve the above shortfalls by defining policies for behaviors of policy-driven script content of a web page such that embodiments of the invention may monitor, enforce, modify, or supplement the behaviors of the script content as it is rendered to a user or before it is rendered to the user. In another embodiment, the defined policies are provided to a local device such that a browser executed at the local device may conveniently compare the script content security boundaries at the local level. Alternative embodiments provide a platform for a policy-driven and policy-enforceable script execution and policy scenarios around content transclusion, component development, and API extensibility especially within the context of web-based mash-ups. Alternative embodiments further provide the ability to automatically support multiple-instancing and provide scope protection. In addition, further aspects of the invention monitor and record user interactions with the script content such that quality of service (QOS) metrics or data may be recorded and reported to the issuers, composers or providers of the script content.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIG. 16 is a block diagram illustrating operations of securing script content within a web page on a client device according to an embodiment of the invention.

Figure 1:
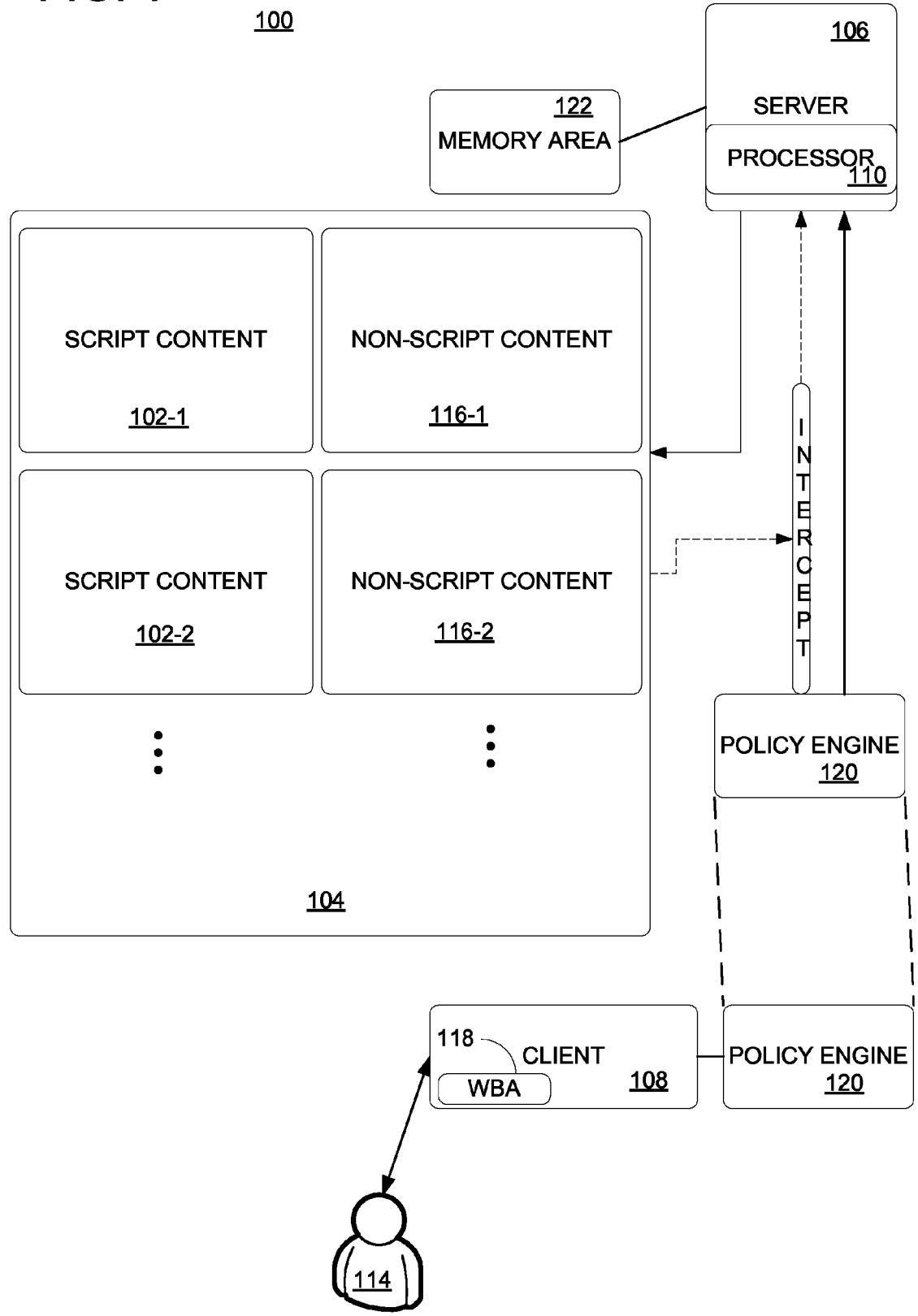
FIG. 1 is a block diagram illustrating an exemplary embodiment of a system for securing script content within a web page according to an embodiment of the invention.

Appendix A illustrates an exemplary implementation of a secure and extensible policy-driven application platform.

Corresponding reference characters indicate corresponding parts throughout the drawings.

DETAILED DESCRIPTION

Embodiments of the invention provide security for in-page script content or functions and provide proper protection to user's content that is displayed or rendered within a web page. Referring now to FIG. 1, a system 100 for securing script content 102 within a content holder 104 according to an embodiment of the invention is illustrated. The system 100 includes a server 106 accessible by a client 108 via a communication network (not shown). In one example, the server 106 includes a collection of networked computers, a computer, a web server, an enterprise server, a database server, an authentication server, a combination thereof, or a collection of the above. In one embodiment, the server 106 may be a federated set of servers providing a variety of services to a user 114. In another embodiment, the server 106 includes a processor 110 which may be a processing unit, a microprocessor, a central processing unit, or a collection/combination of the above examples. In one example, the server 106 provides services such as a web-based electronic mail (e-mail) account, a centralized web portal page that aggregates a variety of personalized information for the user 114, or the like. In another example, the server 106 provides both interactive content and non-interactive content to the user 114 in the form of hypertext markup language (HTML), extensible markup language (XML), JavaScript®, asynchronous JavaScript and XML (AJAX), or the like. It is understood that other content, such as multimedia content, may be provided without departing from the scope or spirit of aspects of the invention.

The client 108 includes any client device associated with the user 114, such as a personal computer (PC) (e.g., a desktop or a laptop), a portable digital device, a personal digital assistant (PDA), a cellular phone, a portable media player, or the like. The communication network includes any wired or wireless communication network that facilitates connections between two or more computers.

In one example, the server 106 is configured to provide the content holder 104 to the user 114 to be rendered or displayed at the client 108. For example, the content holder 104 may be rendered by a web browser application (WBA) 118 installed on the client 108. In one embodiment, the content holder 104 may be a web page, an ASCII text page, a web page with embedded markup language content, a web page with embedded media content or the like. In one embodiment, the WBA 118 is a stand alone application or software. In another embodiment, the WBA 118 may be a part or a component of a program or software that is capable of rendering content written in a markup language, such as hypertext markup language (HTML), extensible markup language (XML), or the like. It is also understood that the WBA 118 may be an application or a component that renders other content in an online environment, such as graphics files (.jpg, .tiff, .pdf, etc.), media files (.wma, .mp3, .mp4, etc.), or the like.

The content holder 104 includes one or more components with content. In one example, a component may include script content 102 and/or non-script content 116. In one example, the script content 102 includes computer-executable instructions, codes, functions, executable expressions, or other executable programming language. The script content 102 may cause an execution invocation via a function call or an application programming interface (API) request or call. The execution invocation may request resources from the server 106, the client 108, or the WBA 118. The non-script content 116, on the other hand, includes content that is not executable or does not give rise to executed results. For example, a text statement (e.g., "Today's news . . . ") may be non-script content 116 but a text statement (e.g., echo("Today's news . . . "); document.write("Today's news . . . ");) may be script content 102 because upon executing the statement, the text statement brings about a functional result that is more than the mere display of the text statement itself.

Figure 2:
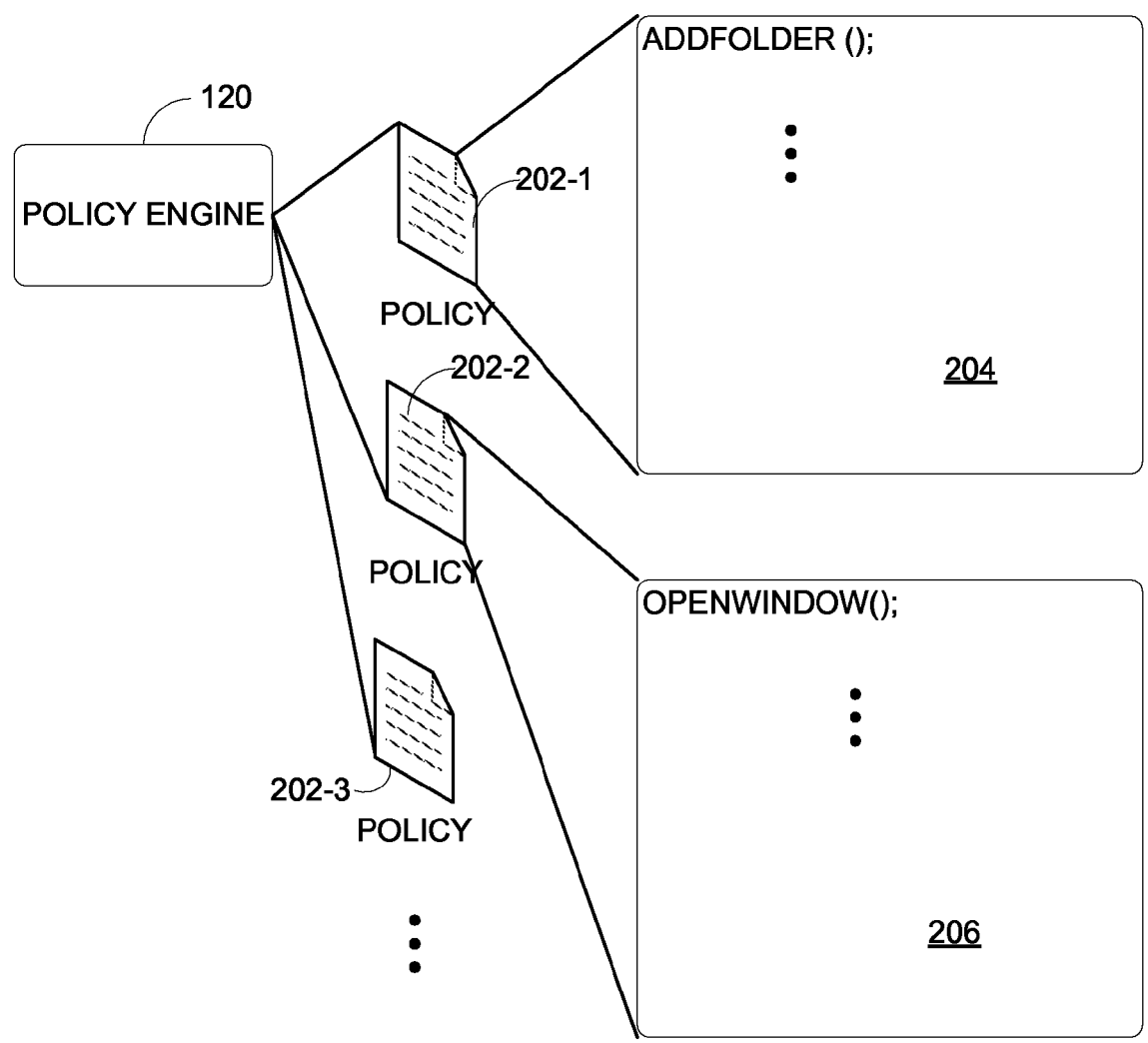
FIG. 2 is a block diagram illustrating an exemplary policy for defining an execution boundary of script content according to an embodiment of the invention.

The system 100 also includes a policy engine 120 including one or more policies for defining execution boundaries for the script content 102. In one example, the policy engine 120 includes a storage medium for storing one or more policies. Referring now to FIG. 2, a diagram illustrates simplistic policies 202 stored in the policy engine 120. In one example, each of the policies 202 defines an execution boundary of a specific script content or function(s) included in the script content. In another example, the policy 202-1 includes the execution boundary of a script content or function called "addFolder( )" 204 while the policy 202-2 includes the execution boundary of a script content or function called "openwindow( )" 206. It is understood that other functions or script content may be included in the policy engine 120 without departing from the scope or spirit of the invention. It is also to be understood that the policy engine 120 may be updated periodically, in whole or in part, as additional functions or script contents are developed, augmented, modified, or upgraded. In an alternative embodiment, the execution boundary indicates the limits of content or resources that may be accessible by the script content or function.

For example, suppose the policy 202-1 defines the execution boundary for the script content "addFolder( )." The execution boundary in the policy 202-1 may define that the script content "addFolder( )" may be executed during runtime within an instance of the WBA 118 after sending a request to the server 106. Also, the boundary may further limit that the result of the script content "addFolder( )," which is creating a folder or a directory, is only limited to accessing a storage space associated with the user 114 when information of the user 114 is rendered by the WBA 118 from the server 106 on the client 108. The "addFolder( )" function has no access (e.g., rights to read) to other information from the storage space. FIGS. 3-9 further illustrate aspects of the invention through a simplified example of a web-based e-mail account of the user 114.

Figure 3:
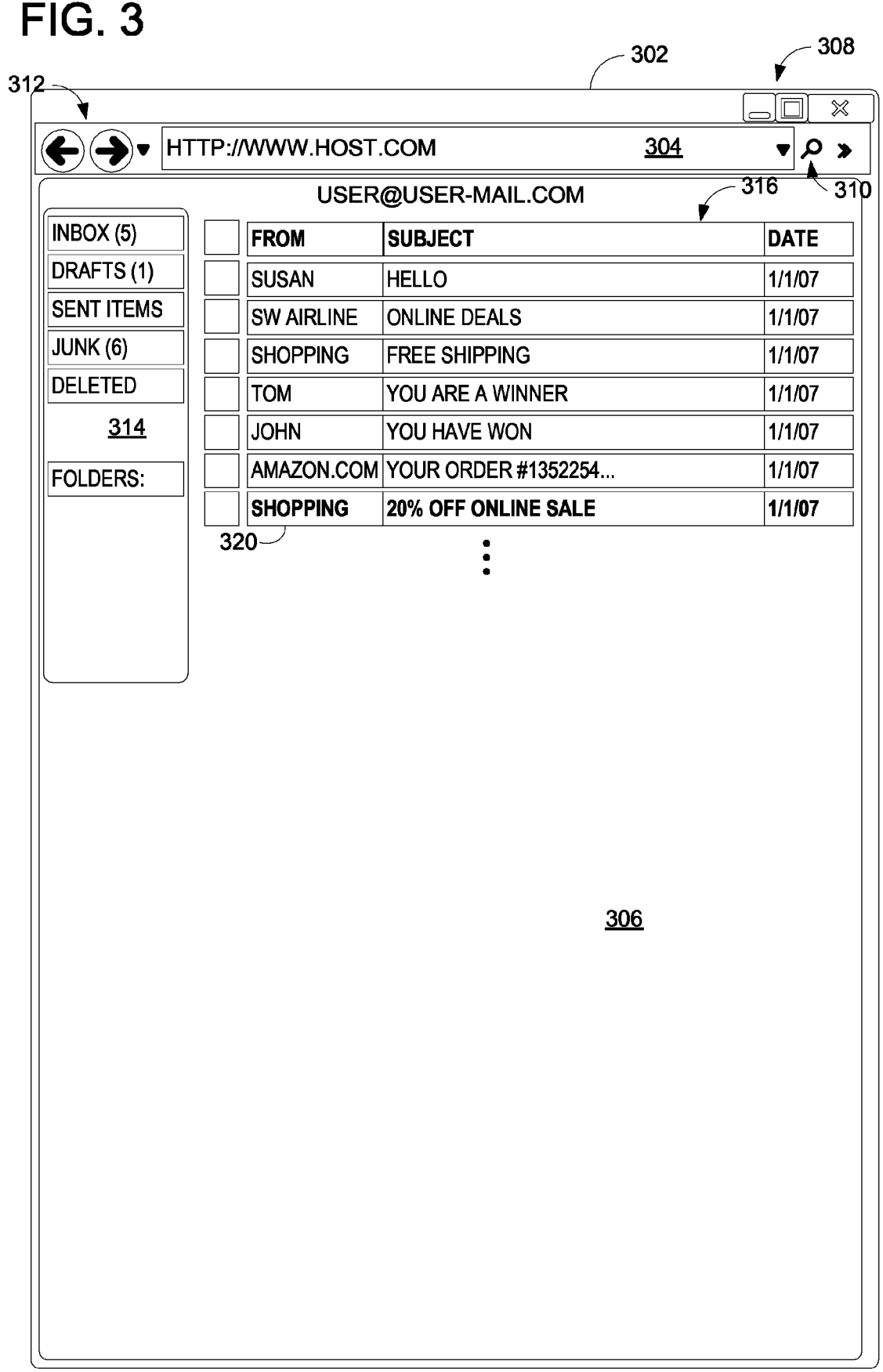
FIGS. 3-9 are exemplary block diagrams illustrating screen displays of script content interactions according to an embodiment of the invention.

For example, in FIG. 3, a display window 302 displays an instance of the WBA 118 installed on the client 108. The display window 302 includes a web address bar 304 and a content display area 306, which displays the content of the content holder 104. Other controls, such as window size control 308 (which includes a window minimizing control, a window maximizing control, and a window closing control), a search control 310, navigation controls 312, or the like may be included. It is also to be understood that other controls may be added or implemented without departing from the scope or spirit of the invention.

In this example where the WBA 118 displays to the user 114 the personal web-based e-mail inbox, the content display area 306 also includes a side pane 314 and a main message pane 316 listing one or more e-mail messages in the inbox of the user 114. As an illustration, the side pane 314 displays a number of controls, buttons or links that link the user 114 to one or more directories or folders within the inbox of the e-mail account user@user-mail.com. For example, the folders include an "inbox" folder, a "drafts" folder, a "sent items" folder, a "junk" folder, and a "deleted" folder. The side pane 314 also includes a section showing one or more personalized folders or directories under the "FOLDERS" heading. In this illustration, there is no personalized folder or directory of the user 114. The display window 302 also displays the list of e-mail messages in the main message pane 316. As illustrated, the display window 302 displays or renders the layout and also content of the user's inbox provided from the server 106. In other words, as long as the content or layout of the user's inbox content is properly recognized by the WBA 118, the display window 302 will present the layout and the content to the user 114 accordingly in the content display area 306. It is also understood that the side pane 314 and the main message pane 316 may be modified depending on the layout of the content holder 104.

Figure 4:
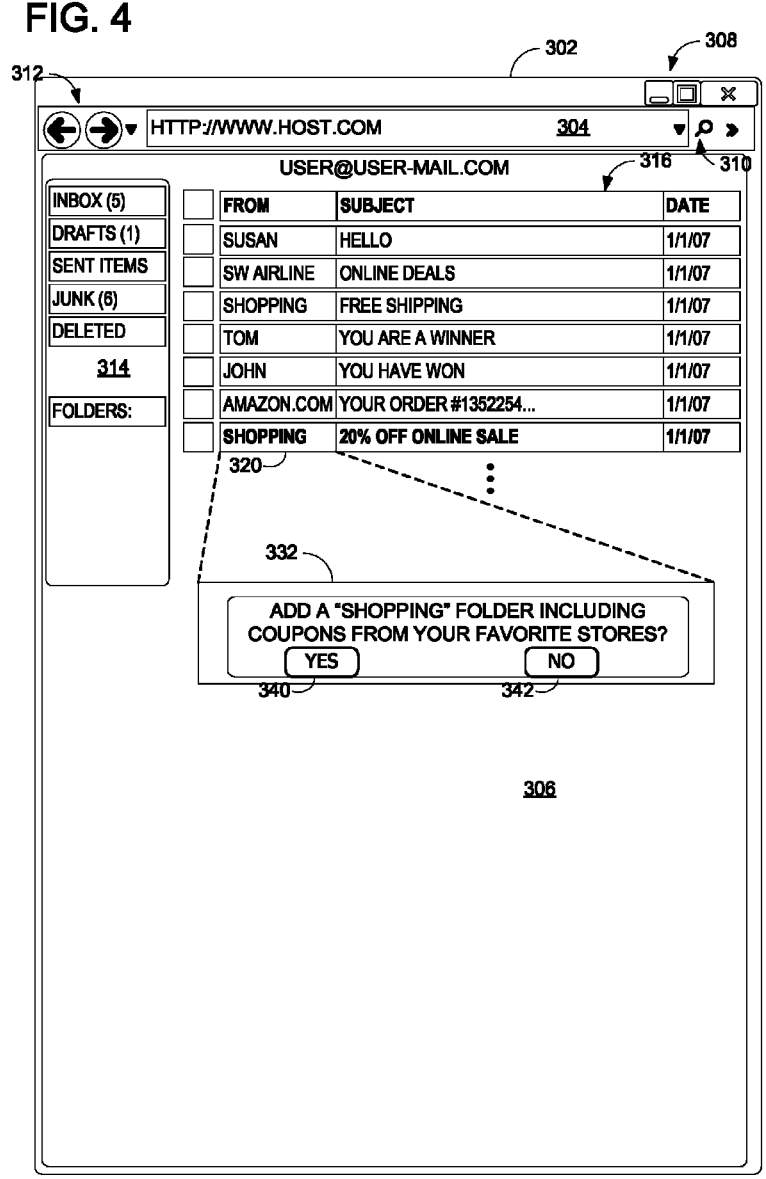

Also in the illustrated example, the user 114 receives an e-mail message 320 that is from "SHOPPING" with a subject line of "20% OFF ONLINE SALE." Referring now to FIG. 4, a diagram illustrates how embodiments of the invention employ a policy-driven application platform by controlling the function calls within the displayed content such that the user sensitive or private content is protected. In this example, suppose the message 320 includes typical non-script content and script content. The non-script content may include text messages advertising shopping sales to the user. The script content of the message 320 includes one or more functions that attempt to add a folder to the e-mail account of the user 114 called "shopping." Such "shopping folder" will hold sales deals, coupons or other sales information for the user 114. The script content may be activated or invoked upon "opening" of the message 320 or after a short delay. In one example, the user 114 may open the e-mail message 320 by using an input device (e.g., a mouse or a stylus) or the user's finger. In one embodiment, the e-mail message 320 may be automatically opened when the user 114 highlights the message 320, such as by hovering a mouse graphical cursor over the message or moving a location marker (e.g., using arrow keys on a keyboard) to the location of the e-mail message 320. It is to be understood that other means to highlight or focus the message 320 to open the message 320 to view the content thereof may be employed without departing from the scope or spirit of the invention.

Current technologies would execute the script content without interference. In other words, if the script content's functions specify opening of display windows, the display windows will be opened. The user 114 would not have control over how the script content is executed. In fact, the server 106 also has no control over the content because the rendering or displaying of content in a web or online environment is typically delegated to the WBA 118. As such, the privacy or content of the user's inbox or other content is subjected to whim of the script content of any displayed page.

Embodiments of the invention define policies to monitor and/or intercept script content such that the script content can only be executed within a defined boundary specified by the defined policies. Aspects of the invention also provide a dynamic resolution in response to evaluating the intercepted script content calls or functions. The dynamic resolution may include at least one of the following: granting the request if the requested resource can be executed within the execution boundary, denying the request if the requested resource cannot be executed within the execution boundary, augmenting the request before granting the request, replacing the request with another request before providing a substitute resolution in response to the another request, and requesting a user input from the user for granting or denying the request.

The user 114 in one embodiment may also be involved in further restricting the performance of the script content. Referring now to FIG. 4 again, as the message 320 is opened and as the script content of the message 320 is executed, the script content of the message 320 is passed to the policy engine 120 for evaluation and the user 114 may aid or participate in the evaluation.

Based on the example above, once the message 320 is "opened," the script content of the message 320 attempts to add a folder to the e-mail account of the user 114 called "shopping" folder using a function such as "addFolder( )". Instead of performing and executing the script content as prior technologies would do, aspects of the invention pass the script content and/or the function call through the policy engine 120. The policy engine 120, as illustrated in FIG. 2, includes one or more rules in handling the function calls. In this example, the policy engine 120 may have been designed to intercept all addFolder( ) function calls and extract the content of the script. In the meantime, the policy engine 120 triggers or enables the executing or running of a substituted function or an additional function, such as a function "alertwindow( )" to open a window 322 to the user 114. The alertwindow( ) function wishes to open the window 322 within an execution environment of the WBA 118 to display a message and interactive controls to the user 114. The displayed message and/or the interactive controls coincide or represent the extracted content from the script content of the message 320.

Figure 5:
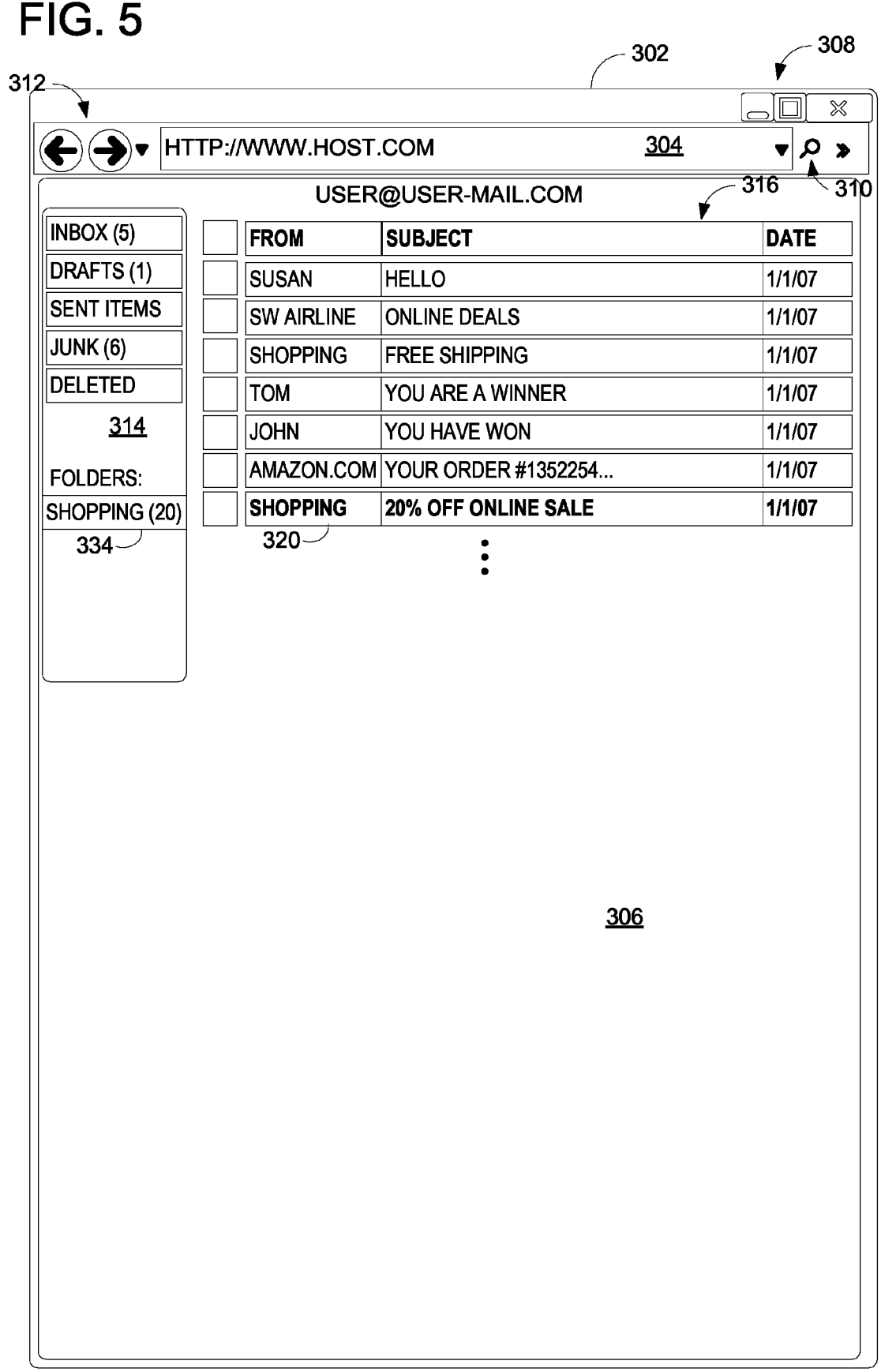

In this example, the substituted alertwindow( ) function wishes open a window to alert the user 114 by displaying the message: "Add a "shopping" folder including coupons from your favorite stores?" The user 114 may either choose to add the folder by clicking on "YES" button 340 or decline the request by clicking on "NO" button 342. If the user 114 selects the "YES" button 340, a new personalized "shopping" folder 334 will be added to the user's personalized folder section, as seen in FIG. 5. Therefore, the user 114 is now part of the decision process in granting or denying the original intent of the script content (e.g., executing the addFolder( ) function) of the message 320.

In another embodiment, the script content of the message 320 may invoke an application programming interface (API) call to resources of the server 106, the processor 110, the client 108 or the WBA 118. In this circumstance, embodiments of the invention may also intercept such API invocations and pass them through the policy engine 120. In one embodiment, the policy engine 120 may choose to allow, deny, augment, or replace the behavior of any call with or without any notifications to the user 114. The calls can originate from an existing API or be defined only via the policy (e.g., they do not have to be pre-existing APIS).

Figure 6:
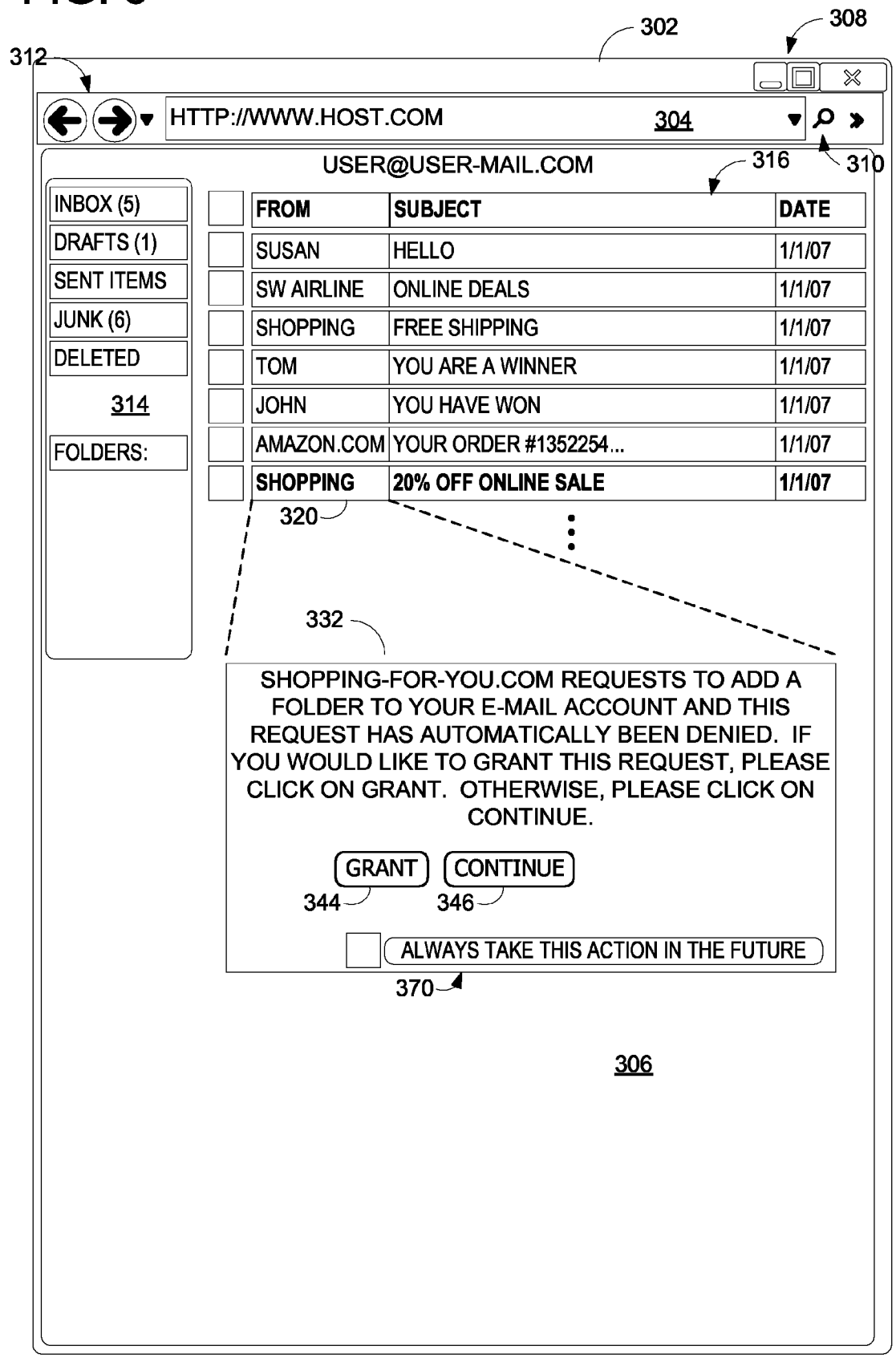

For example, FIG. 6 illustrates an aspect of the invention where requests or calls from script content of a message are automatically denied, but the user 114 is notified of such denial. In this illustration, aspects of the invention enable the policy engine 120 to automatically deny all script invocations or function calls. In doing so, the notification message 332 to the user is modified to display that, "Shopping-for-you.com requests to add a folder to your e-mail account and this REQUEST has automatically been denied. If you would like to grant this REQUEST, please click on grant. Otherwise, please click on continue." The user 114 is presented with a "GRANT" button 344 and a "CONTINUE" button 346 in response to the notification. In other words, embodiments of the invention provide the user 114 the ability to make decision on a one-time basis once the automatic denial policy setting is set. In another embodiment, the notification 332 may include other options such as "Remember my setting," "Remember my setting for two weeks," "Always do this," "Reset my previous decisions," or the like (such as an option 370 "Always take this action in the future").

Figure 7:
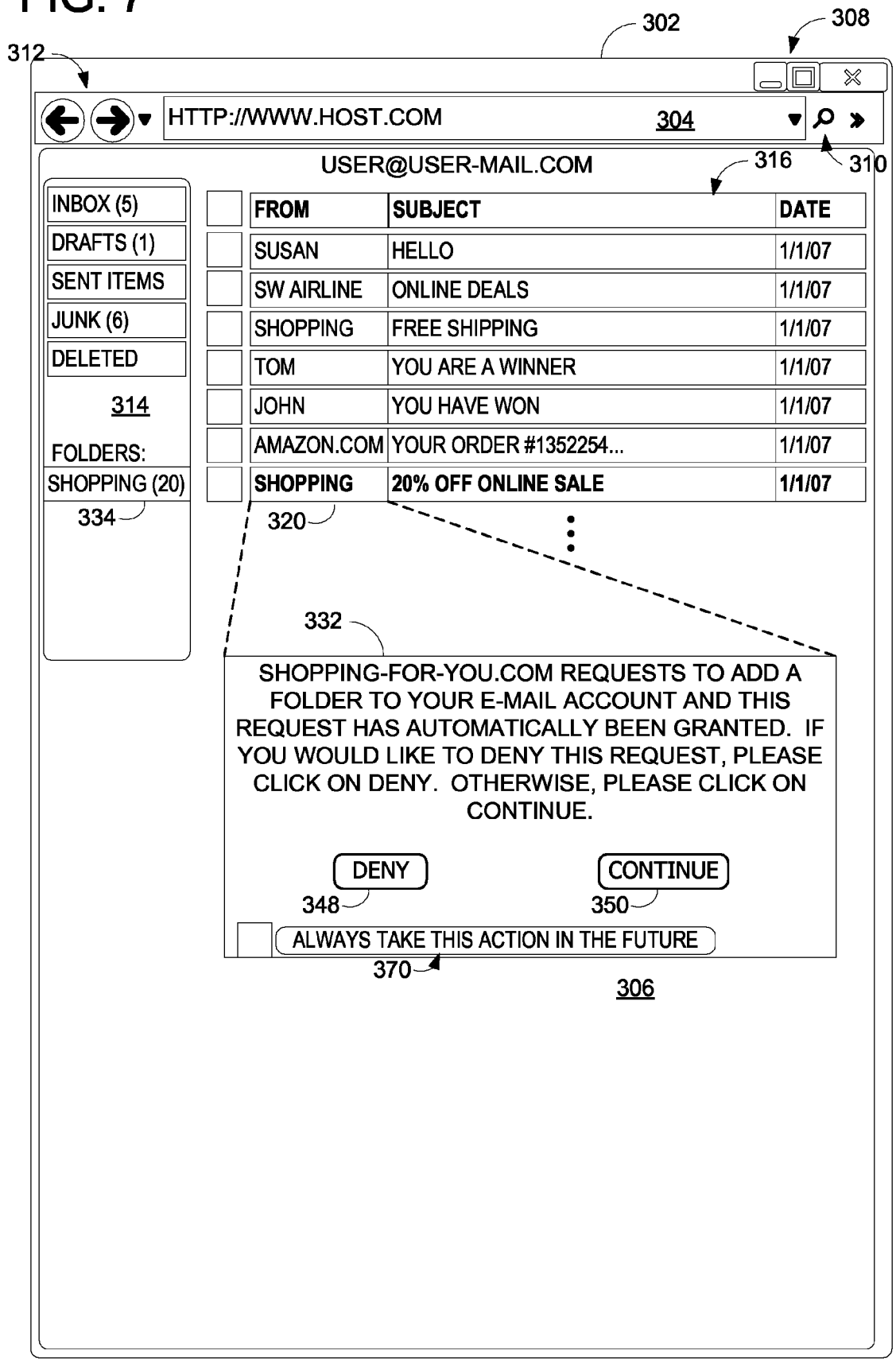

In the alternative, aspects of the invention may also be configured to automatically grant the request or function call and the user 114 again is given an opportunity in FIG. 7 to alter such automatic action by clicking on a "DENY" button 348 or a "CONTINUE" button 350 to continue the default course of action.

Figure 8:
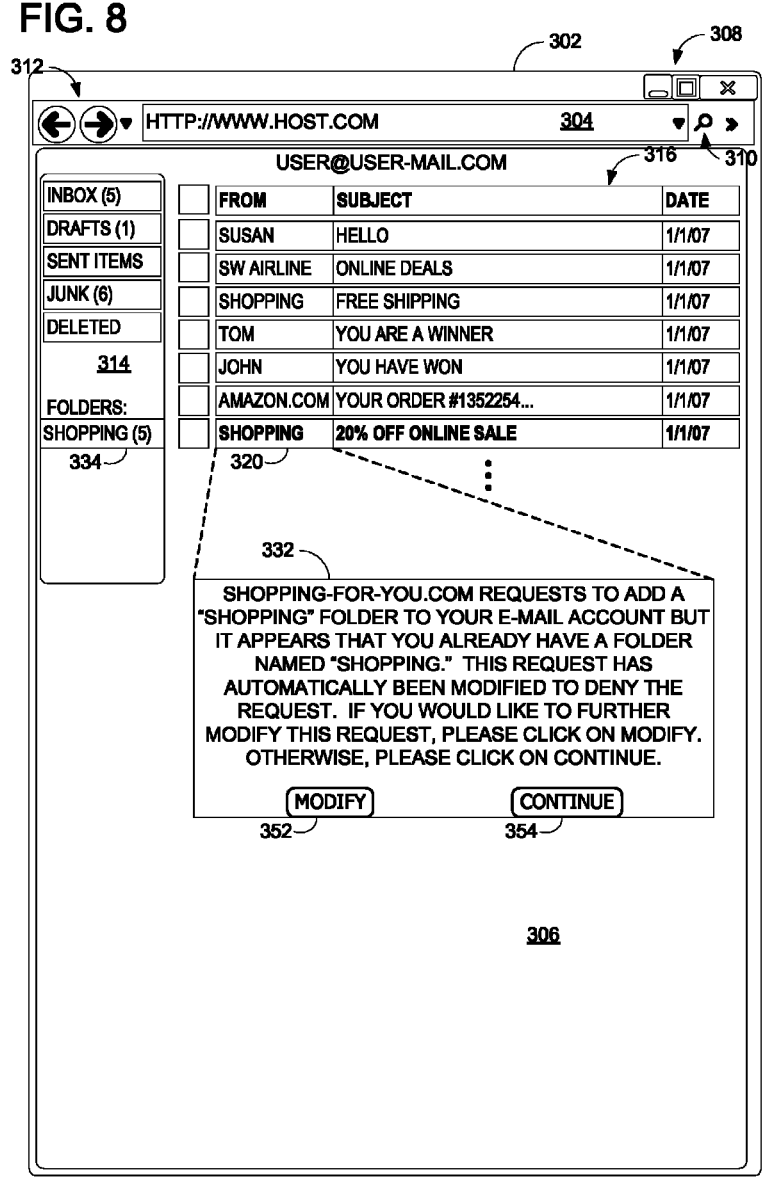
Figure 9:
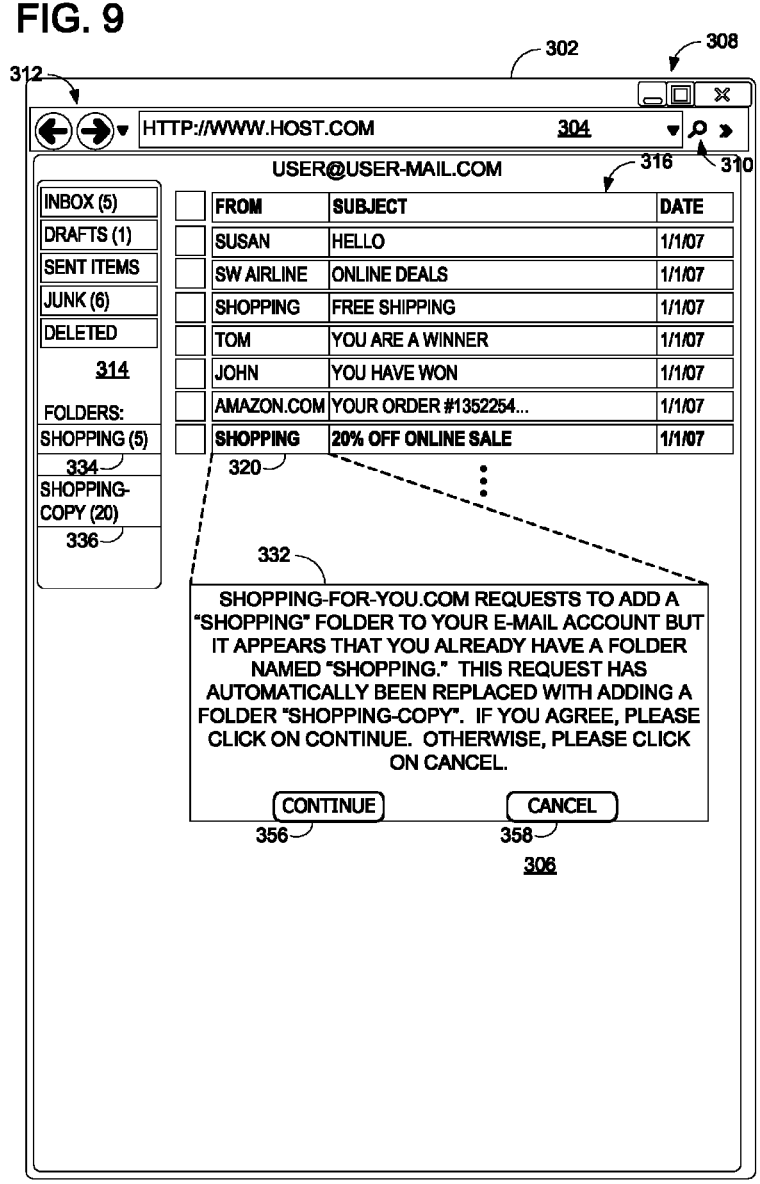

In another embodiment, the policy engine 120 may be configured to modify the intercepted function calls. Referring now to FIG. 8, the message 332 now displays the following if aspects of the invention are implemented to modify the intercepted function calls or API requests: "Shopping-for-you.com Requests to add a "SHOPPING" folder to your e-mail account but it appears that you already have a folder named "shopping." This request has automatically been modified to deny the request. If you would like to further modify this REQUEST, please click on MODIFY. Otherwise, please click on continue." In other words, the modification may also be coupled with denial of the request. As such, the user 114 has the opportunity to modify the request by clicking on "MODIFY" button 352 or "CONTINUE" button 354 to proceed with the modification as defined or set by the policies or rules in the policy engine 120. Similarly, the policies in the policy engine 120 may also couple the modification with automatic grant of the request, such as illustrated in FIG. 9. In FIG. 9, the user 114 is presented with the message 332 indicating that the request has automatically been replaced with adding a folder "shopping-copy" to the user's personalized folder section. The user 114 again have the opportunity to agree with the modification by clicking a "CONTINUE" button 356 or cancel the modification by clicking on a "CANCEL" button 358. In a further embodiment, the modification of the intercepted request may include rewriting the intercepted request such that the script content/request is within the execution boundary based on the defined policy.

In one embodiment, as the WBA 118 is executed, one or more instances of the WBA 118 can be achieved and aspects of the invention properly differentiate each instance during runtime or execution time. For example, the user 114 may have one or more WBA 118 windows running at the same time. As such, as aspects of the invention are instantiated, the instantiation of this invention within current WBA 118 windows requires all code to be first normalized via a simple transformation. This transformation redirects all API calls through the policy engine 118. This step attempts to force the policy engine to be called first and to also inject the appropriate QOS (quality of service) tests (to be discussed later). As a further advantage, each of the instantiated instances of the script content has an independent and separate execution boundary.

In one embodiment, whenever an API is invoked from the script content of the message 320, it is directed against the policy engine 120. The policy engine 120 examines at least one of the following: the type of object making the request, the type of API being called (property, method, factory, or delete) and passes the decision process to at least one of the policy scripts or rules. The policy scripts can choose to deny access (the default), allow, augment (or dynamically choose to deny or allow depending on context), or replace and/or define the behavior.

In one example, policies may be stacked: any single API invocation can be mapped to 0 through n policies or rules. The policies may be executed in defined order. For example, a first-order policy may enable access to a property (e.g., title property), and a subsequent policy may further constrain the rules by enabling access to the property only if on an element within the context of 102-1.

Another example may allow a method (e.g., alert) to be enabled with a subsequent policy overriding the default behavior of alert to display on the status bar rather than via a prompt.

As such, aspects of the invention provide a layer of protection to the user 114 when the content or the content holder the user 114 views online via the WBA 118 may include script functions, executable code and API requests. In one existing example, it is common for a user of a web-based e-mail inbox to have many convenient features, such as automatically adding an e-mail address to the user's contact folder by clicking on a link such as "add to contact." Some e-mail service providers achieve this convenient feature by prompting a user to a separate page to grant the permission. Some providers would automatically perform the requested action as soon as the user clicks on the "add to contact" link. However, some providers would automatically perform the requested action without the user clicking on the "add to contact" link; the providers assume that the user wishes to add the contact and proceed to add the contact without asking the user. As such, the user has no control over the private information in the user's contact folder. Embodiments of the invention attempt to alleviate such problem and shortfall of the current systems by intercepting the function calls or execution request from script content of the content holder 104 and evaluate the function calls before getting the user involved.

In another embodiment, a copy of the police engine 120 is instantiated on or copied to the client 108 such that the interception of the function calls may be done locally on the client 108. In other words, embodiments of the invention enable the WBA 118 to monitor the script content of the content holder 104 and intercept the function calls or API calls as the content holder 104 is rendered or displayed at runtime. The intercepted function calls or requests are evaluated by the policy engine 120 accessible locally by the client 108 and the WBA 118. The WBA 118 may next render any subsequent UI to the user 114 according to the defined policies. In another embodiment, the WBA 118 or the client 108 further pass arguments or result of executing the script content of the content holder 104 to the server 106. Using FIG. 3 as an example, when the message 320 wishes to add a folder to the user's personalized folder list or section, the WBA 118 or the client 108 may pass the user's determination back to the server 106 to either add the "shopping" folder to the user's inbox folder list or deny the request.

In an alternative embodiment, there may not be feedback from the user or decision making like those illustrated in FIGS. 4-9. For example, the content holder 104 may be just a web page that displays content and advertisement. However, the content holder 104 also includes script content, such as performing dynamic operations as the content holder 104 is rendered or displayed. For example, suppose the content holder 104 is a web page with text content (i.e., non-script content) and script content. The script content may be embedded in animated objects, such as movie clips, or graphical objects, such as pictures. These animated objects or graphical objects may be part of an online advertisement and the script content may attempt to produce an effect from other parts of the content holder 104 which may or may not be managed by the server 106. As such, as the online advertisement is rendered or displayed, the script content is subsequently displayed or rendered. However, the desirable effect from the script content on other parts of the content holder 104 may cause the WBA 118 to crash, the client 108 to crash or other undesirable event.

Figure 10:
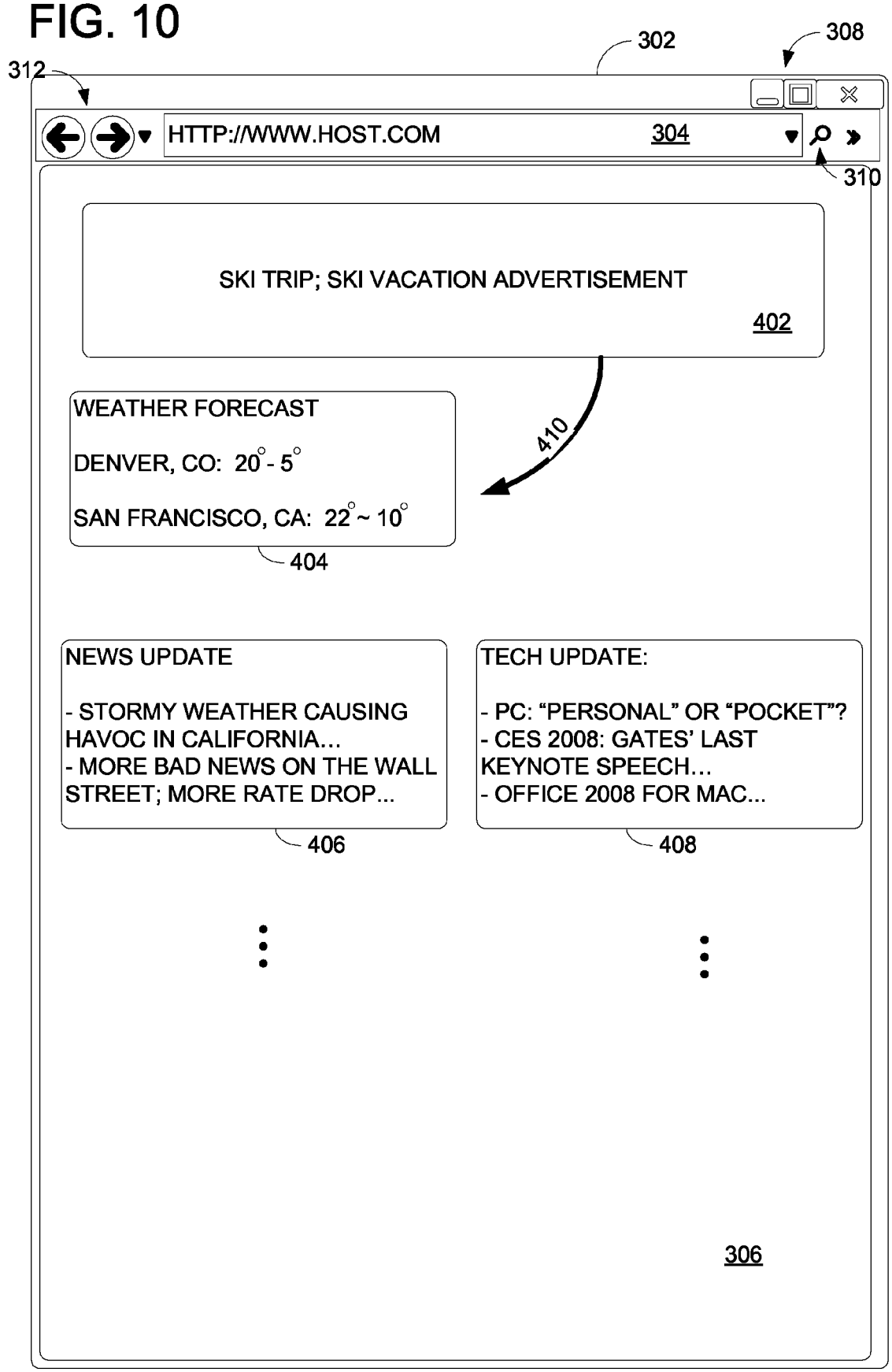
FIGS. 10-11 are block diagrams illustrating a management and measurement of quality of service of the script content according to an embodiment of the invention.

Referring now to FIG. 10 as an illustration of the above example, a block diagram illustrates a management and measurement of quality of service of the script content according to an embodiment of the invention. FIG. 10 illustrates a ski trip or ski vacation advertisement 402 that is displayed in the content display area 306 of the WBA 118. In one example, the advertisement 402 may be part of a content holder, such as a web page. The web page also includes a weather forecast module 404 displaying weather forecast information on the web page. Other contents or modules may be displayed as well, such as a news update module 406 and a tech update module 408. Each module may have metadata associated therewith to tag or identify the characteristic or property of the module. The advertisement 402 also includes script content 410 that includes executable code and function calls. In this example, the script content 410 is designed to add ski resort weather forecast information to relevant content in the content holder such that the user can quickly see what is the weather condition in ski resorts or ski attractions near the location already available on the user's current display page. Once the weather forecast information is added, the advertisement 402 will animate the content to show the picture of the advertised ski resort.

Figure 11:
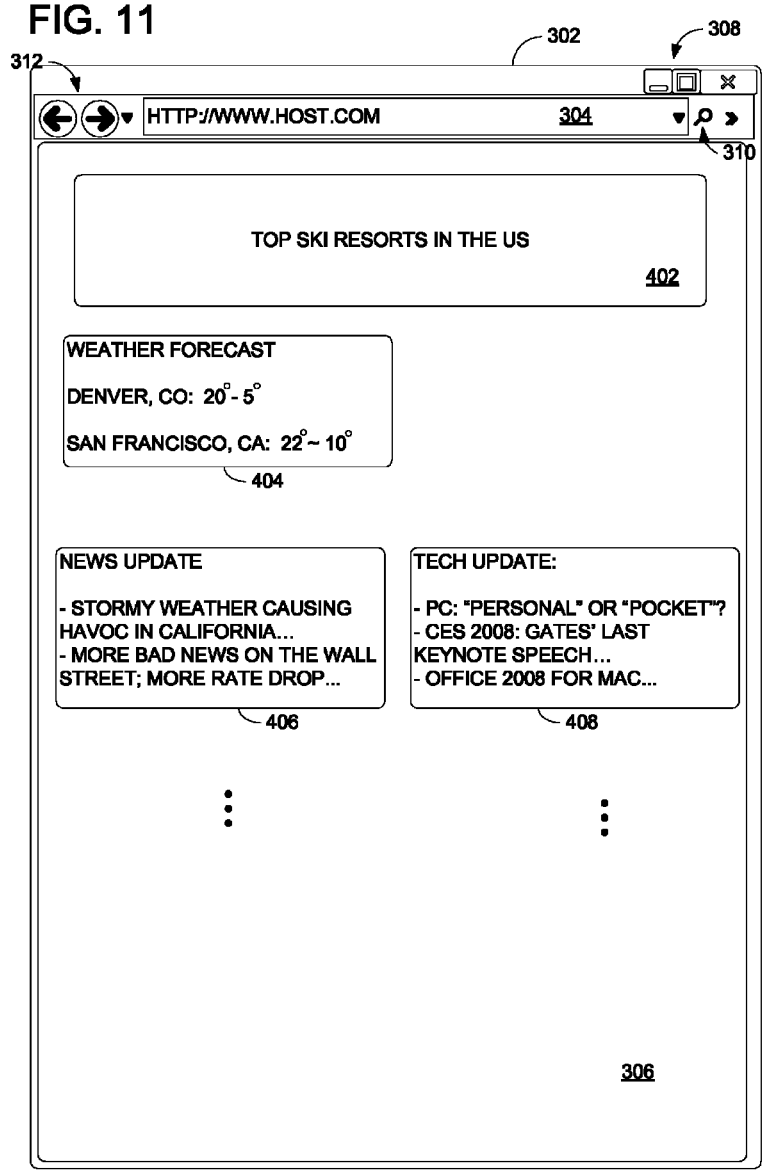

As such, the script content 410 may attempt to read the content of the module 404 to see if the city to which the user wants to know the weather. This attempt will trigger the advertisement 402 to display an advertisement for ski resorts closest to the city of interest to the user. Embodiments of the invention may permit this attempt/action or block or inhibit this attempt/action or operation. If the permission is granted, the advertisement 402 is permitted to see a targeted advertisement. On the other hand, the advertisement 402 may be inhibited from displaying a targeted advertisement and may display a generic advertisement, such as "TOP SKI RESORTS IN THE US" as shown in FIG. 11. As such, embodiments of the invention provide an opportunity for the user to intervene or participate in the decision making.

Figure 12:
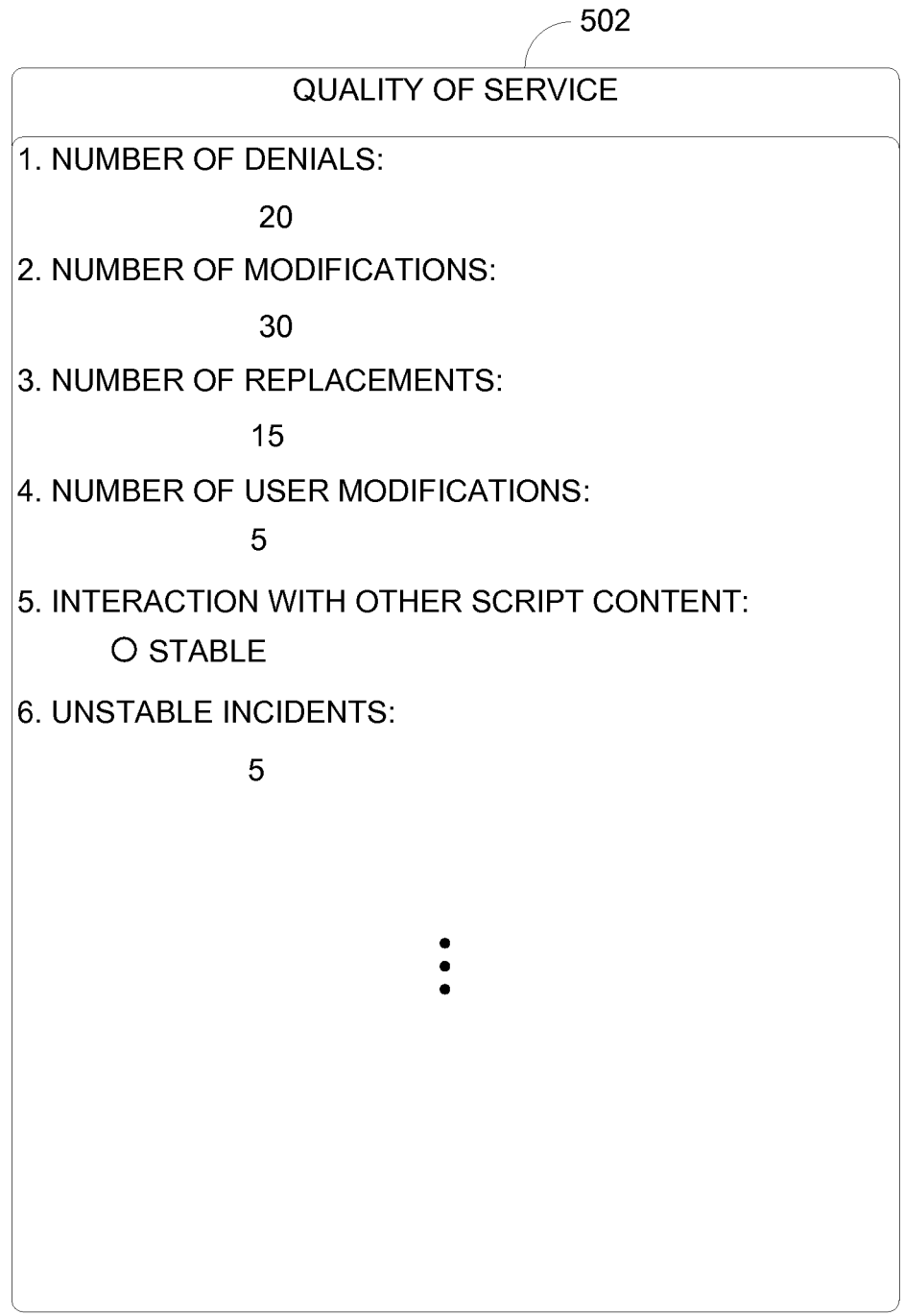
FIG. 12 is a block diagram illustrating an exemplary quality of service data associated with securing script content according to an embodiment of the invention.

Aspects of the invention can measure the effectiveness of such script content to afford effective feedback to the content providers. Referring now to FIG. 12, a block diagram illustrates an exemplary quality of service data 502 associated with securing script content according to an embodiment of the invention. By intercepting each and every function call, API request, or the like from the script content, embodiments of the invention can properly evaluate the requests and the evaluation is properly recorded in a memory area 122. For example, FIG. 12 illustrates an exemplary quality of service metrics that can be collected and forwarded to the content providers. For example, the quality of service data 502 includes fields such as "number of denials," "number of modifications," "number of replacements," "number of user modifications," "interaction with other script content," and "unstable incidents." In the examples illustrated in FIGS. 10-11, the denial of the advertisement 402's script content may be treated as "unstable incidents." In another embodiment, the WBA 118 or the client 108 may record unexpected exception or crash of the WBA 118 due to the inability to display content in the content holder. This recording or log may also be forwarded to the server 106 for collecting data for "interaction with other script content." In a further example, execution activities between the script content, the WBA 118, the client 108, and/or the server 106 may be monitored, recorded, and stored in response to the interception and the evaluation. The execution activities such as activities between the provided solution and the other portions of the online content, activities between the provided solution and the script content of the online content, activities between the provided solution and the user, and activities between the provided solution, the script content, and the WBA 118, or the like may be monitored, evaluated, measured, and later provided to a content provider of the script content. It is also to be understood that other quality of service metrics may be defined and relevant data collected without departing from the scope and spirit of the invention.

In a further embodiment, the policy engine 120 may have an intermediary intercept all properties, method invocations, and object factories where the call is validated before being executed. Validation may be dynamic (it is not merely on or off) and the decision process can take into account all details. In addition, the policy engine 120 automatically encapsulate the untrustworthy code in its own sandbox that can be instantiated multiple times, each potentially with its own unique overriding policy.

Alternative embodiments include policies that provide more than just security protection. The differences in policies may be normalized between execution systems (e.g., browsers), and the policies may also extend the default capabilities with new APIs, or make bugs or other issues transparent to the developer.

For web-based scriptable content, before applying policies, the resources (e.g., HTML, CSS, and Scripts) currently may need to be transformed server-side. This transformation is not a validation step but rather merely enables the client-side policies to be applied at execution time. It can be envisioned that alternative embodiments may enable the transformation step to be part of a larger process of "publishing" or "rendering" content, along with code validation, versioning, author profiles, etc.

While often viewed in the context of the browser or the WBA 118, all the aforementioned challenges around mashups is applicable to any environment where untrustworthy content (whether it be script, DLL's, etc) is executed within a greater application. Therefore, the WBA 118 should nearly be viewed as one possible instantiation.

Compared to traditional web gadgets (which are components isolated on the page), embodiments of the invention allow the code or the script content to execute natively within the page and, depending on policy, have access to surrounding APIs or context. This approach also serves as a host-driven model for website extensibility.

Figure 13:
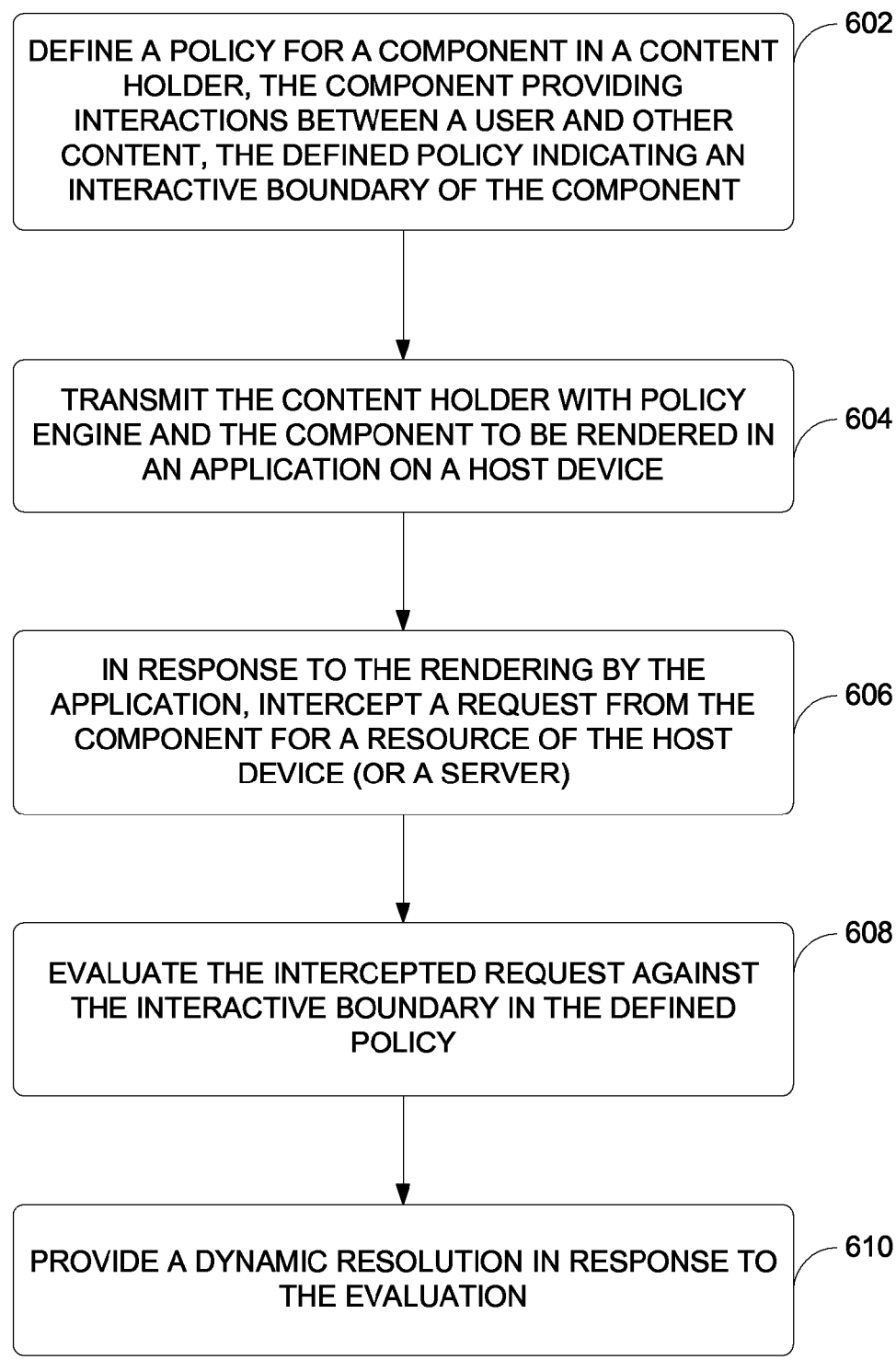
FIG. 13 is an exemplary flow chart illustrating operation of securing script content within a web page according to an embodiment of the invention.

Referring now to FIG. 13, an exemplary flow chart illustrating operation of securing script content within a web page according to an embodiment of the invention. For example, at 602, a policy for a component in a content holder is defined. The component provides interactions between a user and other content in the content holder. The defined policy indicates an execution boundary of the component. At 604, the content holder with the policy engine and/or the component are transmitted for rendering in an application on a host device. In response to the rendering by the application, a request from the component for a resource of a server is intercepted at 606. The resource provides services to the component for interaction with at least one of the following: the user and the other content from the content holder. At 608, the intercepted request is evaluated against the execution boundary in the defined policy. A dynamic resolution is provided in response to the evaluating at 610.

Referring now to FIG. 16, a block diagram illustrates operations of securing script content within a web page on a client device according to an embodiment of the invention. FIG. 16 further expands on one embodiment similarly described in FIG. 1. A client device 702 includes a local memory 704, a display 706 and an application 710. The local memory 704 storing policies 708 from a remote memory area 712, which is accessible by a remote server, such as the server 106. Each of the policies defines an execution boundary for a function or application program. In one example, the execution boundary defines the resource access limitations or access priorities of the function or the application program. In this embodiment, the application 710 (e.g., the WBA 118) renders content transmitted from remote computing devices to the client device 702. In one example, the content may be aggregated in a content holder (e.g., a web page) and the content may be an online content including content written in markup languages, content with graphics and multimedia, or the like. At 712, upon rendering the content, the application 710 identifies a web script content of the content holder in response to rendering, providing, or loading the online content. The identified web script content, as already described above, is configured to issue an execution invocation to interact with other portions of the online content. The execution invocation, for example, may include function calls, function requests, API invocations, API calls or the like. The execution invocation may also request other resources without departing from the scope of embodiments of the invention. At 714, the application 710 intercept the issued execution invocation from the identified web script content.

At 716, the application 710 may further identify parameters included in the intercepted execution invocation. The identified parameters may, among other operations, request resources from the application or the client device for interacting with the other portions of the online content. In another embodiment, the identified parameters may request resources from the application or the client device for interacting with a user, such as the user 114. At 718, the application 710 evaluates the identified parameters against the execution boundary of each of the policies stored in the local memory 704. For example, the application 710 analyzes the identified parameters against the execution boundary and determines whether the web script content may be executed within the execution environment of the application 710 or the client device 702. The application 710 provides to the application a dynamic resolution in response to the evaluated parameters at 720. As previously described, the resolution may involve modifying, replacing, removing, or augmenting the issued execution invocation. At 722, the display 706 may display the provided resolution 722 to the user.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including client device 702, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

A Sample Implementation

Figure 14:
FIGS. 14-15 are block diagrams illustrating alternative embodiments of securing script content within a web page according to an embodiment of the invention as described in Appendix A.

The following example illustrates the transformation from source code to safe code, and the execution of the safe code, which are illustrated in FIG. 14 (the innermost rectangle "CODE SAMPLE" 1402). In FIG. 14, consider the following source "code:"

```
<html xmlns="http://www.w3.org/1999/xhtml">
<head>
<style type="text/css">
body
{
   background: lightblue;
   margin: 0px;
}
</style>
<title>Sample</title>
</head>
<body>
  <h2>Code Sample</h2>
  <p>Current Time: <span id="currentTime"></span>
  <br>Click inside to see the body HTML</p>
<script type="text/javascript">
  document.body.attachEvent("onclick",function( )
    {
      alert(document.body.innerHTML);
    }
  )
  window.setInterval(function( )
  {
    document.getElementById("currentTime").innerText = new Date( );
  }
```

```
,10 )
</script>
</body>
</html>
```

Figure 15:
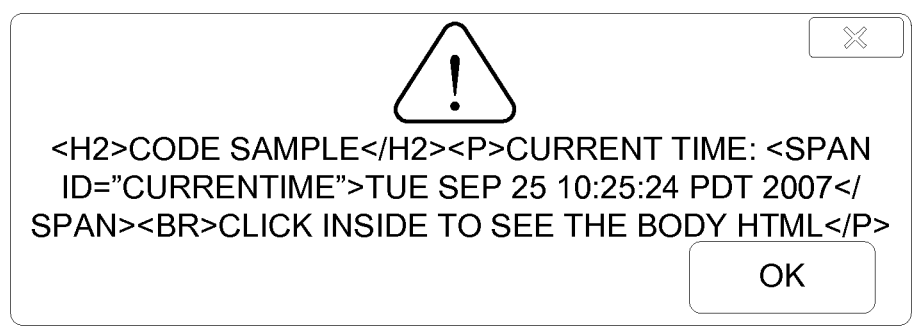

As you can see the above source contains CSS, HTML and JavaScript. The CSS applies styles to the <body> tag, and the script attaches an event to the "body". The HTML contains a <span> with an "id". We shall see that during the transformation and execution of the above source code the Runtime will:
1. Ensure that the "body" referenced by the code is the sandboxed container for the code in the result page (in this embodiment the sandbox is a <div>), as illustrated in FIG. 15. This applies to the CSS style as well as the script references (attachEvent and innerHTML); and 2. Rename the "id" of the <span> section to an id unique to this code. This is transparent to the code, so it still accesses "currentTime". The Runtime takes care of the mapping.

When the above code is transformed, the following is produced:

```
$Policy.registerCode(function(a){
s.addSheet({"%body%":{"margin-left":"0px","margin-
right":"0px","margin-top":"0px","margin-
bottom":"0px","background":"lightblue"}});
    var b = a.g,
        c = a.s,
        d = a.i,
        e = a.n,
        f = a.f;
    c(b(document,"documentElement"),"innerHTML",
"<H2>Code Sample</H2><P>Current Time: <SPAN id=currentTime>Tue
Sep 25 09:05:08 PDT 2007</SPAN><BR>Click inside to
see the body HTML</P>");
    d(b(document,"body"),"attachEvent",["onclick",f(function( )
    {
        d(window,"alert",[b(document,"body"),"innerHTML")])
    })]);
    d(window,"setInterval",[f(function( )
    {
        c(d(document,"getElementById",["currentTime"]),"innerText",
        e(Date,[ ]))
    }),10]);
    c(document,"title","Sample")
},"SampleCode")
```

The current embodiment transforms the original HTML into: a method call: registerCode. As can be seen, this method call can be safely injected into a container page. They are simply calls into the Runtime. The transformation step converted the CSS into a "JSON" format. This JSON object is used as input to the Runtime.

One embodiment has simply transformed the HTML from the source into a property value for the "innerHTML" of the "documentElement". The Runtime will ensure that the HTML is safe and conforms to the prevailing policies. Note: Future embodiments may transform the source HTML into other formats such as JSON. In this embodiment, instead of calling "addSheet" as illustrated above, a setting is passed to registerCode.

The JavaScript code was transformed into calls into Runtime methods "b", "c", "d" etc. These are the Runtime methods that ensure that property set/get, method invocation and object creation conform to the policies.

When the transformed code is "run" in the resultant page, the Runtime produces the following code fragments:

```
<STYLE>.ms_id1 {
    BACKGROUND: lightblue; MARGIN: 0px; _$SafeType: ruleStyle
}
</STYLE>
```

The source CSS used the "tag selector" syntax to apply the style to the "<body>" tag. This has been transformed into a "class selector" that applies to an element with a class of "ms_id1". This is the <div> section that is now the "sandbox" for the transformed HTML:

```
<DIV class="ms_id1" id=TestGadgetBlock style=" . . . "
_$SafeType="tag">
<H2> Code Sample</H2>
<P>        Current        Time:        <SPAN
id=ms_id1currentTime_$SafeType="tag"> Tue Sep. 25
09:38:07 PDT 2007</SPAN><BR> Click inside to see the
body HTML</P></DIV>
```

As can be seen, the Runtime has prefixed the <span> id with "ms_id1" to ensure that it is unique. The sandboxed code, of course, is unaware that this has happened. On each timer tick it sets the innertext of "currentTime".

The CSS background color of "lightblue" has only been applied to the sandboxed area allocated to the source. When one clicks inside this area, the code shows an alert box containing the "body."

What is claimed is:

1. A method of evaluating a web interactive component, said method comprising:
    defining a policy for a component in a content holder, said component providing interactions between a user and other content in the content holder when the component is rendered, said defined policy indicating an execution boundary of the component during runtime, said execution boundary defining resource access limitations of the component;
    transforming at least a portion of a script content within the component to a property value of a function to be executed at runtime of the component, wherein the execution boundary defines access priorities of the runtime function;
    transmitting the content holder with the transformed component to be rendered in an application on a host device;
    in response to the rendering by the application, intercepting a request from the transmitted component to a server for a resource of the server, said intercepting inhibiting receipt of the request by the server, wherein the resource provides services to the transmitted component for interaction with at least one of the following: the user and the other content from the content holder;
    evaluating the intercepted request against the execution boundary in the defined policy; and
    providing to the server or the application a dynamic resolution in response to the evaluated request.

2. The method of claim 1, wherein providing the dynamic resolution comprises at least one of the following: granting the request if the requested resource can be executed within the execution boundary, denying the request if the requested resource cannot be executed within the execution boundary, augmenting the request before granting the request, replacing the request with another request before providing a substitute resolution in response to the another request, and requesting a user input from the user for granting or denying the request.

3. The method of claim 1, further comprising providing an application programming interface (API) for receiving the request from the component, and wherein intercepting comprises intercepting a request from the API for a resource of the server.

4. The method of claim 1, further comprising instantiating a plurality of instances of the components.

5. The method of claim 4, wherein intercepting comprises intercepting a request from each of the plurality of instantiated instances of the component for a resource of a server.

6. The method of claim 1, further comprising modifying the request from the component in response to the evaluating, said modifying the request comprises rewriting the request such that the request is within the execution boundary based on the defined policy.

7. A system of evaluating security of script content that integrates code and behaviors from various sources, said system comprising:
    a processor configured to execute computer-executable instructions for:
        defining a policy for the script content in a web page, said script content providing interactions between a user and other content within the web page, said defined policy indicating an execution boundary of the script content, said execution boundary defining resource access of the script content;
        evaluating the script content against said execution boundary in the defined policy;
        transforming, at runtime, at least a portion of the web page in response to the evaluating;
        transforming at least a portion of the script content, within the web page, to a property value of a function included in the script content to be executed at runtime of the component, wherein the execution boundary defines a priority of the function;
        replacing the transformed portion of the script content with another property value mapping another script content, said another property value falling within the execution boundary of the defined policy when executed at runtime; and
    an interface for transmitting the web page with the transformed portion of the script content to be rendered in an application on a host device.

8. The system of claim 7, wherein the processor is further configured to provide to the server or the application a dynamic resolution in response to the evaluating.

9. The system of claim 8, wherein the dynamic resolution comprises at least one of the following: granting a request if the transformed portion of the web page can be executed within the execution boundary, denying a request if the transformed portion of the web page cannot be executed within the execution boundary, augmenting a request before granting the request, replacing the request with another request before providing a substitute resolution in response to the another request, and requesting a user input from the user for granting or denying a request from the transformed portion of the web page.

10. The system of claim 8, further comprising an application programming interface (API) for receiving the request from the script content, and the processor executes the API to process the received request for a resource of a server.

11. The system of claim 7, wherein the processor is further configured to instantiate a plurality of instances of the script content.

12. The system of claim 7, wherein the processor is further configured to modify the script content during transforming, wherein the processor rewrites the script content to conform with another script content, and said another script content being within the execution boundary based on the defined policy.

13. A method of securing a web interactive function, said method comprising:
    defining a policy for the web interactive function in a web page, said web interactive function providing interactions to a user and to other content in the web page, said defined policy indicating an execution boundary of the web interactive function, said execution boundary defining resource access of the web interactive function;
    transmitting the web page to be rendered in an application on a host device;
    in response to the rendering by the application, monitoring the web interactive function for a request to interact with the user or the other content in the web page;
    intercepting the monitored request from the web interactive function to a server for a resource of the server, said intercepting inhibiting receipt of the request by the server, wherein the resource provides services to the web interactive function for interaction with at least one of the following: the user and the other content from the web page;
    evaluating the intercepted request against the execution boundary in the defined policy;
    rewriting the intercepted request such that the rewritten request is within the execution boundary based on the defined policy;
    transforming at least a portion of a script content of the web interactive function to a property value of a runtime function included in the script content to be executed at runtime of the component, wherein the execution boundary defines an access priority of the runtime function; and
    providing to the server or the application a dynamic resolution in response to the evaluating.

14. The method of claim 13, wherein providing the dynamic resolution comprises at least one of the following: granting the request if the requested resource can be executed within the execution boundary, denying the request if the requested resource cannot be executed within the execution boundary, augmenting the request before granting the request, replacing the request with another request before providing a substitute resolution in response to the another request, and requesting a user input from the user for granting or denying the request.

15. The method of claim 13, further comprising providing an application programming interface (API) for receiving the request from the function, and wherein intercepting comprises intercepting a request from the API for a resource of the server.

16. The method of claim 13, further comprising instantiating a plurality of instances of the function when a plurality of web pages is rendered by the application.

17. The method of claim 16, wherein intercepting comprises intercepting a request from each of the plurality of instantiated instances of the component for a resource of the server.

* * * * *